United States Patent [19]

Louzil

[11] 4,422,082

[45] Dec. 20, 1983

[54] JET NOZZLE PLATE FOR AN INK JET PRINTING HEAD AND METHOD OF MANUFACTURING SUCH A JET NOZZLE PLATE

[75] Inventor: Friedrich Louzil, Vienna, Austria

[73] Assignee: U.S. Philips Corporation, New York, N.Y.

[21] Appl. No.: 314,931

[22] Filed: Oct. 26, 1981

[30] Foreign Application Priority Data

Nov. 7, 1980 [AT] Austria .............................. 5493/80

[51] Int. Cl.[3] ............................................ G01D 15/18

[52] U.S. Cl. ................................ 346/75; 346/140 R; 29/527.4

[58] Field of Search ................. 346/75, 140 R, 140 IJ; 29/527.4

[56] References Cited

U.S. PATENT DOCUMENTS 4,007,464 2/1977 Bassous et al. ............. 346/140 IJ X 4,106,975 8/1978 Berkanblit et al. ........ 346/140 IJ X 4,106,976 8/1978 Chiou et al. ................ 346/140 IJ X 4,169,008 9/1979 Kurth ............................... 346/75 X

*Primary Examiner*—George H. Miller, Jr.

*Attorney, Agent, or Firm*—Robert S. Smith

[57] ABSTRACT

A method of manufacturing a jet nozzle plate utilizes a base plate in which a bore having a diameter which is larger than the inner diameter of the ultimate jet nozzle is provided in order to form a jet nozzle, after which on the front thereof a recess is milled which concentrically surrounds the bore at a distance. Subsequently, the base plate is covered as a unit, as far as into the bore, with a layer of a chemically depositable material, whose thickness defines the inner diameter of the bore to the inner diameter of the ultimate jet nozzle. Subsequently, the front of the plate is ground down as far as the layer in the recess and is etched, the material of the base plate exposed by grinding then being removed until the layer projecting from the bore forms a freely projecting cylindrical tube which is surrounded by a trough.

8 Claims, 12 Drawing Figures

JET NOZZLE PLATE FOR AN INK JET PRINTING HEAD AND METHOD OF MANUFACTURING SUCH A JET NOZZLE PLATE

BACKGROUND OF THE INVENTION

1. Field of the Invention

The invention relates to a method of manufacturing a jet nozzle plate for an ink jet printing head, utilizing a base plate in which there is provided a bore in order to form a jet nozzle, said bore having a diameter which is larger than the internal diameter of the ultimate jet nozzle, the base plate being subsequently covered as a whole unit, as far as into the bore, with a layer of a chemically depositable material.

2. Description of the Prior Art

A method of this kind is described in IBM Technical Disclosure Bulletin, Vol. 15, No. 9, pages 2845 and 2846. The base plate thereof is provided with a bore in which a wire is concentrically inserted, the diameter of said wire corresponding to the inner diameter of the ultimate jet nozzle, after which the base plate is covered as a whole unit, as far as into the bore, with a layer of a material which is chemically deposited, after which the wire is removed by etching so that the jet nozzle is cleared. A given length of the wire projects from the bore, so that material is also deposited thereon and a jet nozzle is formed which consists of a tube whose free end projects from the jet nozzle plate. A method of this kind is not easy to perform, particularly in view of the centering of the wire in the bore.

For the formation of a jet nozzle plate where a jet nozzle is formed by a tube whose free end projects from the jet nozzle plate, it may be stated that even though favorable properties are thus obtained as regards the ejection of droplets of ink from such a jet nozzle plate, it is difficult to cap the jet nozzle exactly with a capping device when the jet nozzle is out of operation, for example, in the rest condition of the ink jet printing head, in order to prevent drying of the ink in the jet nozzle and hence clogging of the nozzle so that it can no longer be used. This difficulty arises inter alia because the capping device, customarily consisting of a slightly elastic cushion, is not exactly flatly arranged against the end face of the tube but is curved around this end, so that it does not completely cover the jet nozzle. In this respect German Auslegeschrift 23 62 576 proposes an embodiment of the jet nozzle plate in which an annular trough is provided around a jet nozzle, said trough being adjoined by a dam having a plane surface which is situated at the same level as the end face of the jet nozzle which itself is also tubular. However, said German Auslegeschrift 23 62 576 does not describe how such a jet nozzle plate can be efficiently manufactured.

It is the object of the invention to provide a method of manufacturing a jet nozzle plate of the kind set forth where a jet nozzle which is formed by a tube is surrounded by an annular trough which is adjoined by a dam having a plane surface. The execution of such a method should be as simple as possible, but it should also be ensured that a jet nozzle plate of this kind can be very accurately manufactured.

To this end, the method in accordance with the invention is characterized in that prior to the covering of the base plate, consisting of a selectively chemically etchable material, preferably brass, with the layer which consists preferably of nickel, on the front thereof there is milled a recess which surrounds the bore mainly concentrically at a distance after which the layer is deposited with a thickness which defines the inner diameter of the bore to the inner diameter of the ultimate jet nozzle, after which the front of the base plate is ground down by an amount which at least equals the thickness of the layer but which is smaller than the sum of the thickness of the layer and the depth of the recess, after which the base plate is etched from the front to remove the material of the base plate exposed by the grinding operation until the layer projecting from the bore forms a freely projecting cylindrical tube which is surrounded by an annular trough. Thus, using technologically suitably controllable methods, at the same time the jet nozzle consisting of a free end of a tube is formed as well as a dam which extends at a distance from the jet nozzle, determined by an annular trough, and which serves as a bearing surface for a capping device. The surface of the dam extends exactly in the same plane as the end face of the free end of the tube, so that particularly accurate capping of the jet nozzle by means of a capping device is possible.

It has been found that the recess surrounding a bore is preferably formed as a circular ring by milling. The recess can thus be simply and accurately formed by means of an end-milling cutter.

It has also been found that the recess surrounding a bore is preferably formed by the milling of straight grooves which together form a polygon. The recess can thus be simply formed by means of a side-milling cutter.

Using a method as described above, for example, the recess surrounding a bore can be milled to a depth which is smaller than the thickness of the layer subsequently deposited thereon. Because the amount by which the front of the base plate must be ground down must be larger than the thickness of the layer but smaller than the sum of the thickness of the layer and the depth of the recess, grinding may be comparatively critical in the above case when the depth of the recess is small. Therefore, it has been found that the recess surrounding a bore is preferably milled to a depth which is greater than the thickness of the layer subsequently deposited thereon, after which the front of the base plate is ground down so far that the layer present in the recess is also slightly ground. The amount of grinding is thus larger, so that the grinding operation can be better controlled. Because grinding is continued until the layer present in the recess is also slightly ground, it is achieved that no raised edges which could distrub the suitable capping of the jet nozzle remain along the edges of the layer present in the recess.

It has also been found that a further recess which has the same depth as the recess surrounding a bore is preferably milled along the edge of the base plate. Thus, without the method becoming more complex, at the area of the edge of the jet nozzle plate an additional dam is formed as a bearing surface for a capping device which also benefits the capping of a jet nozzle.

For a method of manufacturing a jet nozzle plate comprising at least two adjacent jet nozzles it has been found that the recesses surrounding the adjacent bores are preferably milled to change over into one another. The dams thus form a coherent bearing surface around the jet nozzles, which also has a favorable effect on the capping of the jet nozzles with a capping device.

It has also been found that the recess surrounding a bore is preferably extended to the edge of the base plate by further milled recesses which have the same depth as the recess surrounding the bore. Thus, a dam having a maximum bearing surface for a capping device is obtained, so that a jet nozzle can be particularly accurately capped.

BRIEF DESCRIPTION OF THE DRAWINGS

The invention will be described in detail hereinafter with reference to the drawings which show some embodiments in accordance with the invention, however, without the invention being restricted thereto.

DESCRIPTION OF THE PREFERRED EMBODIMENT

Figure 1:
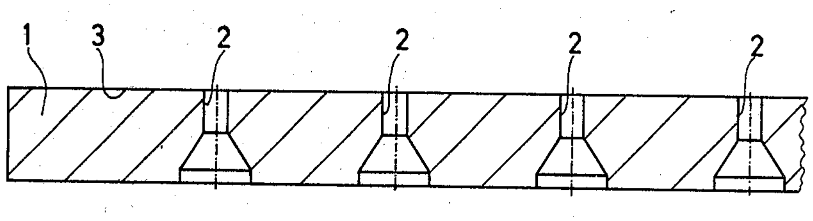
FIG. 1 is a sectional view of a part of a base plate with bores.

The principle of the method of manufacturing a jet nozzle plate in accordance with the invention will be described in detail hereinafter with reference to the FIGS. 1 to 7. The reference numeral 1 in FIG. 1 denotes a part of a base plate for a jet nozzle plate which consists of a chemically etchable material, preferably brass. For this embodiment it is assumed that the jet nozzle plate must comprise two adjacent rows of jet nozzles, the jet nozzles in the one row being staggered with respect to the jet nozzles in the other row and each row comprising, for example, twelve jet nozzles. Obviously, it is alternatively possible to provide more than two rows of jet nozzles or only one row of jet nozzles, and the number of jet nozzles may also be different, for example, a single jet nozzle; this is completely dependent on how the characters are formed by means of the ink jet printing head for which such a jet nozzle plate is intended. In order to form the individual jet nozzles, the base plate 1 is first provided with bores 2 which are cylindrical at the front 3 of the base plate, widen in a conical mannner and finally become cylindrical again. It has been found that such a shape which is known per se is attractive in view of the ultimate configuration of the ink jet nozzles and the connection of the ink supply ducts to the individual jet nozzles of the jet nozzle plate (which is irrelevant in this context). However, it is also possible to impart only a simple cylindrical shape to the bores 2. The diameter of the bores 2 is chosen to be larger than the inner diameter of the ultimate jet nozzle. This offers the advantage that the formation of the bores 2 is simpler, because the inner diameter of a finished jet nozzle is usually very small, for example, in the order of magnitude of 0.05 mm.

Figure 2:
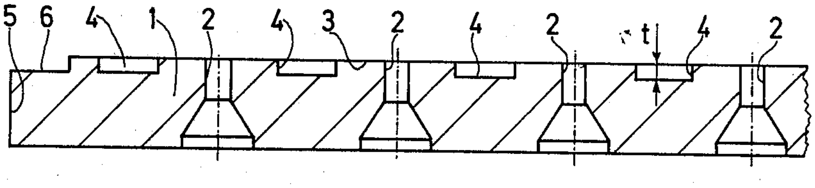
FIG. 2 shows the base plate of FIG. 1 with the recesses which surround a bore.
Figure 3:
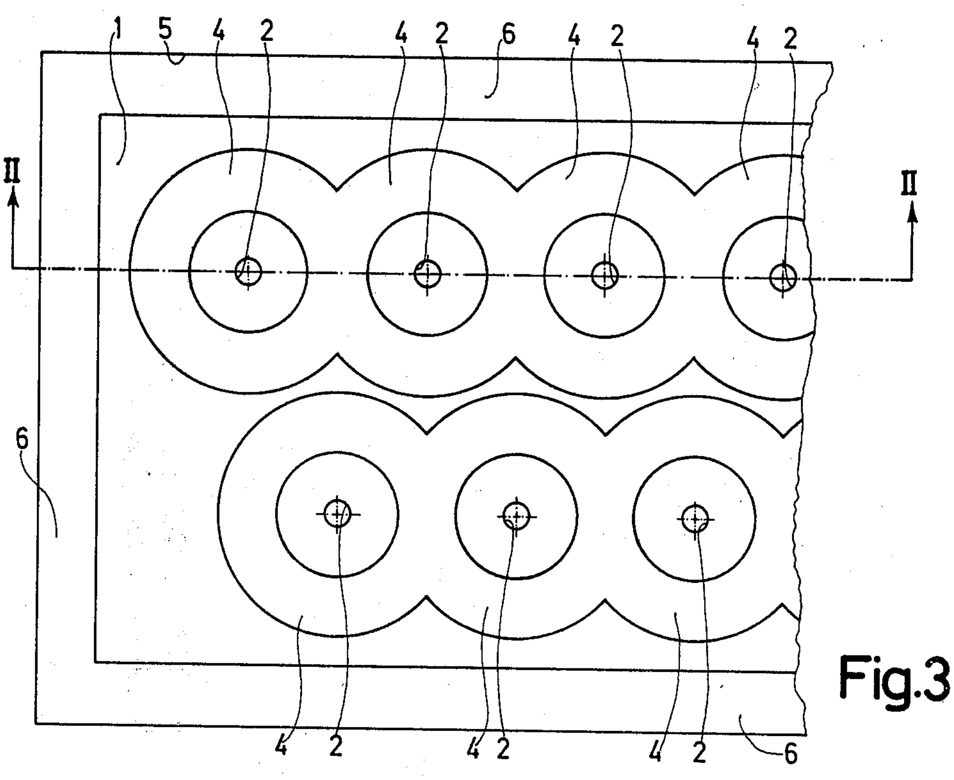
FIG. 3 is a plan view of the base plate of FIG. 2.

The following step in the manufacture of the jet nozzle plate is the milling of a recess at a distance 4 around each bore on the front 3 of the base plate 1 so that it is concentric to each bore 2, as appears from the FIGS. 2 and 3. The recesses 4 in this embodiment are shaped as annular rings which can be very accurately formed by means of an end-milling cutter. The inner diameter and the outer diameter of the circular ring of this embodiment are chosen so that two adjacent circular rings in a row overlap one another, i.e. the recesses 4 in a row change over into one another. It would alternatively be possible to choose the diameters of the circular rings so that two adjacent recesses do not overlap, each bore 2 then being surrounded by a recess whih is formed as a closed circular ring. It has been found that the inner diameter of the circular ring preferably amounts to eight times the inner diameter of the ultimate jet nozzle, because it is then ensured that the finished jet nozzles formed by the tubes in the course of the method are free. The outer diameter of the circular rings then results from the distance between two bores or finished jet nozzles which may be in the order of magnitude of, for example, 0.5 mm. The depth t of the recesses 4 may be chosen, for example, in the order of magnitude of 0.04 mm in view of the other dimensions given. It has also been found (to be elaborated hereinafter) that in the zone along the edge 5 of the base plate 1 a further recess 6 which also covers the edge is preferably milled in the same depth as the recess 4 surrounding a bore 2.

Figure 4:
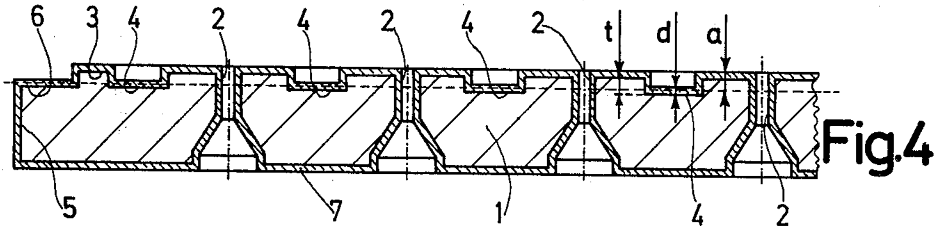
FIG. 4 shows the base plate of FIG. 2 after deposition of a layer.
Figure 5:
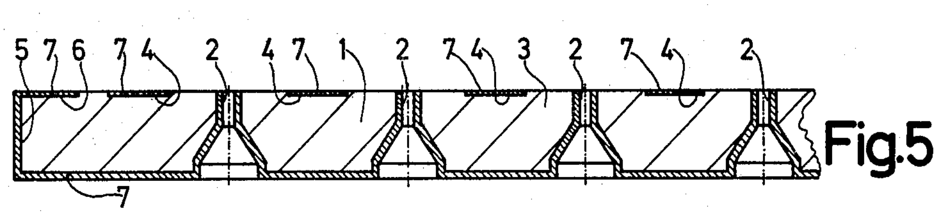
FIG. 5 shows the base plate of FIG. 4 after the grinding of the front side thereof.
Figure 6:
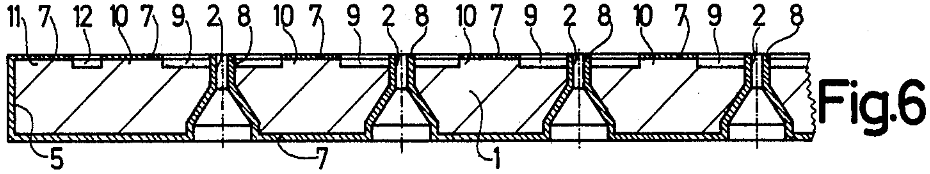
FIG. 6 shows the base plate of FIG. 5 after the etching of the front thereof in order to finish the jet nozzle plate.
Figure 7:
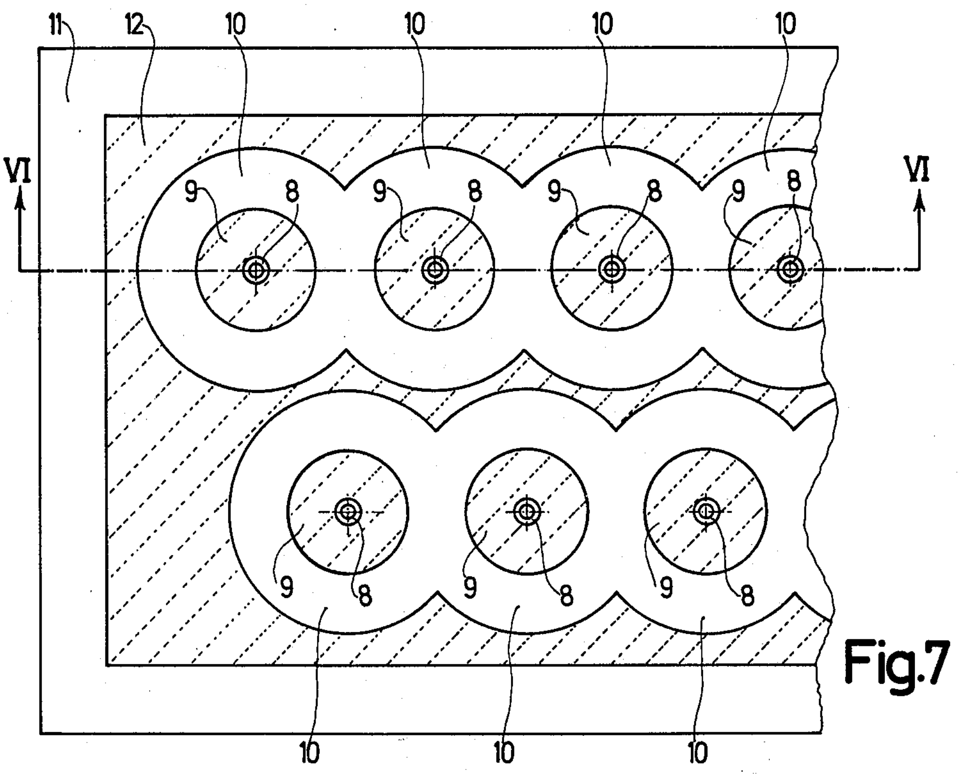
FIG. 7 is a plan view of the jet nozzle plate shown in FIG. 6.

The base plate thus treated is subsequently covered as a unit, as far as into the bores 2, with a layer 7 of a chemically depositable material, for example, nickel. The thickness d of this layer is chosen so that the inner diameter of the ultimate jet nozzle is defined by the deposition of this layer. For example, a value of approximately 0.03 mm may be chosen for the thickness of the layer 7. Thus, a base plate 1 is obtained as shown in FIG. 4. As can be readily seen, the depth t of the recesses 4 in this embodiment is chosen so that it exceeds the thickness d of the layer 7.

During the next step, the front 3 of the base plate 1 is ground down by an amount a which at least equals the thickness of the layer 7 but which is smaller than the sum of the thickness d of the layer 7 and the depth t of the recesses 4. In this embodiment, this amount a is so chosen within the said limits that during the grinding down of the front of the base plate, the layer 7 present in the recesses 4 is also slightly ground as shown in the FIGS. 4 and 5. Thus, around each bore, or anywhere where no recesses 4 and 6 are present, material of the base plate 1 is exposed, the originally continuous layer 7 thus being divided into separate layers 7. Because grinding is continued until the layers present in the recesses are also ground, it is achieved that no raised edges remain along the edges of these layers, with the result that the front of the base plate forms a completely flat surface.

Finally, the base plate 1 is etched from the front 3 down, any exposed material of the base plate being removed, but not the material of the layers 7 still present. This means that the etching operation leaves the material of the layer 7 which is present in the bores 2, so that free cylindrical tubes 8 are formed, each of which forms an ultimate jet nozzle as appears from the FIGS. 6 and 7. Due to the removal of the material of the base plate 1 around each of the tubes 8, each of these tubes is surrounded by an annular trough 9 which is adjoined by a surrounding dam having a plane surface which has withstood the etching operation, because it is covered by a layer 7. Accordingly, each dam 10 consists of the material of the base plate at its base and of the material of the layer 7 at its top. The width of the troughs 9 corresponds to the inner diameter of the circular rings constituting the recesses 4. As a result of the layer 7 present in the recess 6, a dam 11 is also present along the edge 5 of the base plate, while between this dam and the dams 10 which surround the troughs 9 material of the base plate has also been removed, so that again a trough-like recess 12 exists, as clearly shown in FIG. 7 in which all regions which are situated below the surfaces of the dams 10 and 11 are shaded. Because the surfaces of all dams 10 and 11 and the end faces of the tubes 8 forming the jet nozzles have been formed during the sole grinding operation of the front of the base plate, they are all situated in the same plane.

As can be seen, a jet nozzle plate thus manufactured offers the known advantages, i.e. on the one hand the individual jet nozzles consist of free cylindrical tubes which are very suitable for the ejection of ink droplets, while on the other hand the troughs 9 which keep the individual jet nozzles free are surrounded by dams 10 having a plane surface which is situated in the same plane as the end surfaces of the tubes 8 forming the jet nozzles, so that these dams 10 can be used as bearing surfaces when such a jet nozzle plate is capped by means of a capping device in order to prevent drying of the ink present in the jet nozzles and hence clogging of the jet nozzles. Moreover, the dams 10 which are situated at a distance from the tubes 8 also offer protection against damaging of the comparatively vulnerable tubes forming the jet nozzles; this may also be considered as an advantage.

In this embodiment, the layers 7 which surround the jet nozzles 8 at a distance and which are arranged in a row have a coherent surface, which may be attributed to the fact that the relevant recesses 4 in which these layers are present were formed to change over into one another. It has been found that such a formation of the layers 7 is very attractive, because uniform capping of the jet nozzles is thus additionally stimulated. As have already been described, however, it is alternatively possible for the recesses 4 not to change over into one another. In that case each jet nozzle 8 is surrounded at a distance by a separate layer 7 at a higher level, which may already be considered to be sufficient for suitable capping of the jet nozzles.

Figure 8:
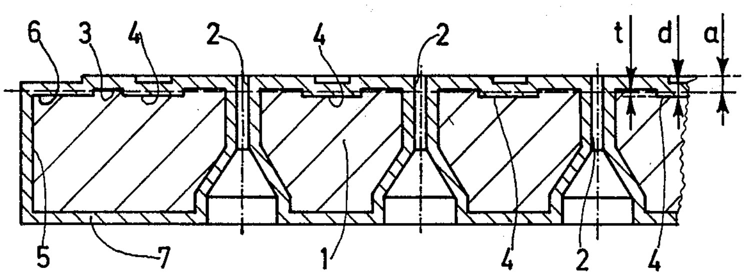
FIG. 8 shows, in the same way as FIG. 4, a base plate where the depth of a recess surrounding a bore is smaller than the thickness of the deposited layer.

With reference to FIG. 4 it has already been stated that the depth t of the recesses 4 is preferably chosen to be larger than the thickness d of the subsequently deposited layer 7. The same result as regards the ultimate shaping of the jet nozzle plate, however, can also be obtained by choosing the depth t to be smaller than the thickness d; these circumstances are shown in FIG. 8. In that case the front of the base plate must again be ground down by an amount a which is again larger than the thickness d but smaller than the sum of the thickness d and the depth t. Because the depth t itself is now smaller, the grinding may be more critical in this case, but less material has to be removed, which may also be advantageous in given circumstances. The etching of such a base plate after the grinding is realized in exactly the same way as in the described embodiment.

Figure 9:
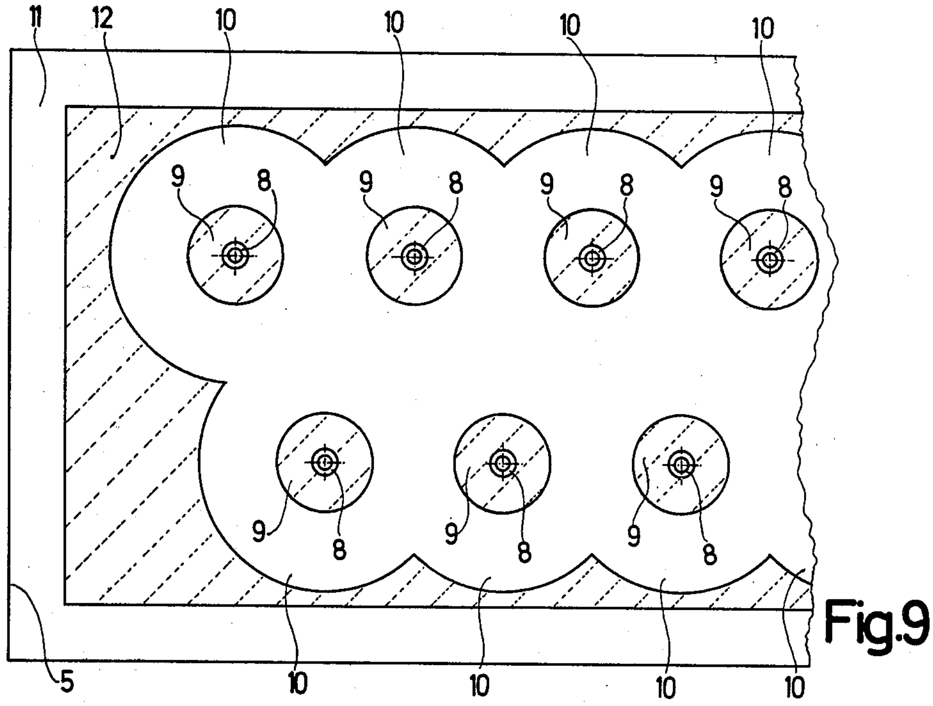
FIG. 9 shows, in the same way as FIG. 8, a jet nozzle plate where all dams surrounding the annular troughs change over into one another.

The dams 10 which are situated at a higher level and which adjoin the troughs 9 in the jet nozzle plate in FIG. 9 for both rows of jet nozzles form a coherent surface which offers an even better support for a capping device. To this end, during the formation of the recesses 4 the diameters of the circular rings are chosen so that the recesses 4 overlap one another also at the area between the two jet nozzle rows. A similar result could be obtained, for example, by providing a further trough-shaped recess between the two rows of bores 2 in the embodiment described with reference to the FIGS. 1 to 7, said further recess interconnecting the already provided recesses 4.

Figure 10:
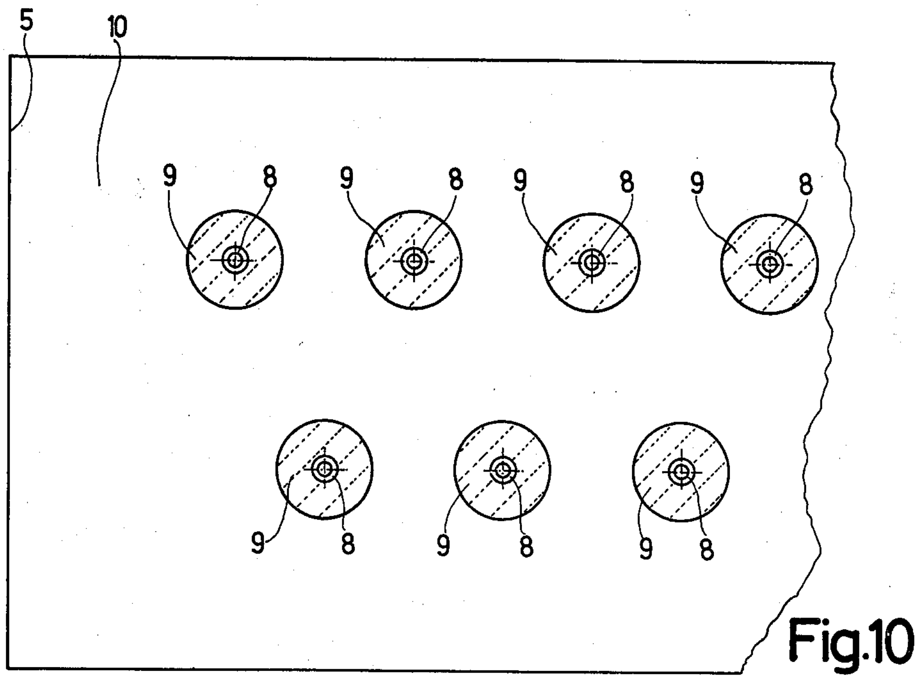
FIG. 10 shows, analogously to FIG. 9, a jet nozzle plate where the dams which surround the annular troughs and which change over into one another extend as far as the edge of the base plate.

In the embodiment shown in FIG. 10, a maximum bearing surface for a capping device is obtained. The dams 10 which surround the troughs and which are situated at a higher level extend in known manner as far as the edge 5 of the base plate and change over into one another to form a coherent surface. This is realized in that after the formation of the recesses 4 in the form of circular rings, these recesses are made to extend, by further milling to the same depth as that of a recess 4 surrounding a bore, as far as the edge 5 of the base plate. In other words, the entire front of the base plate outside the recesses 4 is milled as far as into these recesses. It has been found that such a jet nozzle plate offers very good results in practice.

Figure 11:
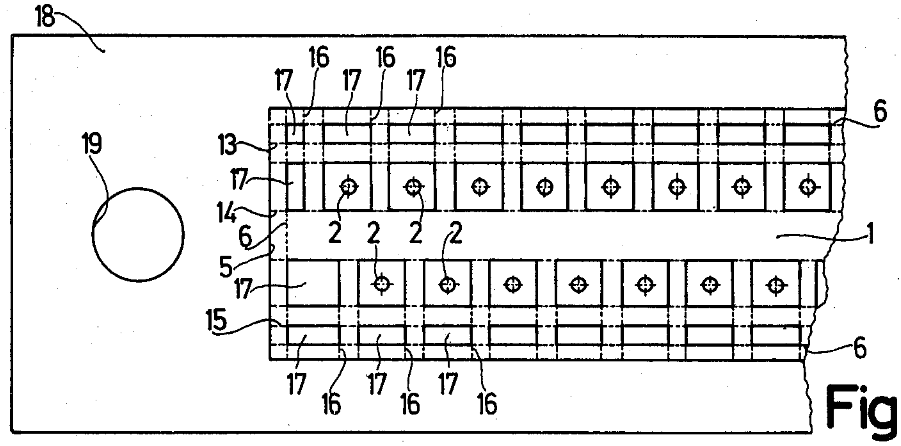
FIG. 11 shows, in the same way as FIG. 3, a base plate where the recess surrounding a bore is formed by the milling of straight troughs which together form a square.

In the embodiment of FIG. 11, showing a base plate provided with recesses in the same way as FIG. 2, the recesses surrounding the bores 2 at a distance are formed by the milling of straight troughs which together form a polygon. These troughs are denoted by broken lines in FIG. 11. There are provided three continuous troughs 13, 14 and 15 which extend in the longitudinal direction of and adjacent the two rows of bores 2, and further troughs 16 which extend transversely of the former troughs each time laterally of each bore 2. These troughs thus each time enclose a rectangle which surrounds a bore 2 at a distance. Along the edge 5 of the base plate there is again provided a recess 6 which also encloses the edge. All these recesses again have the same depth and can be simply formed by means of a side-milling cutter. Outside the two rows of bores 2, separate higher fields 17 remain which, however, can also be removed by milling if a maximum bearing surface is to be obtained like in the embodiment shown in FIG. 10. The further steps of the method of manufacturing the jet nozzle plate are completely analogous to the already described method. All regions which are at a higher level on the base plate of FIG. 11 of the finished jet nozzle plate then form the troughs situated at a lower level and the regions which are situated at a lower level on the base plate of FIG. 11 form the higher dams.

In this embodiment, the base plate 1 is formed by a higher part of a larger plate 18 in order to facilitate the fixation of the very small jet nozzle plate to the ink jet printing head. For example, this can be realized by means of screws for which purpose corresponding holes 19 are provided in the plate 18.

Figure 12:
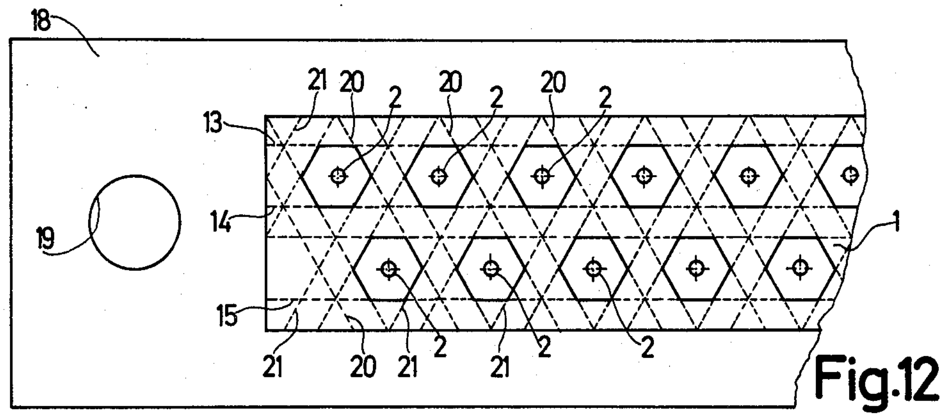
FIG. 12 shows, analogously to FIG. 11, a base plate in which the milled straight troughs together form a hexagon.

The embodiment of FIG. 12 comprises a base plate similar to that of FIG. 11 in which, however, the straight troughs together form a hexagon. To this end, again three continuous troughs 13, 14 and 15 are provided which extend adjacent to and in the longitudinal direction of the two rows of bores 2. Also provided are crossing continuous troughs 20 and 21 which extend at an angle with respect to the former troughs, each time laterally of a bore 2, so that hexagonal edges are formed as shown. The troughs can again be simply formed by means of side-milling cutters. After the formation of such a base plate in the described manner, a jet nozzle plate is again obtained whose jet nozzles which are formed by the tubes are each surrounded by a trough which has a hexagonal edge and which changes over into dams, so that the individual jet nozzles are again uniformly concentrically situated in a free manner.

Obviously, further modifications of the described embodiments are feasible. This is applicable, for example, to the choice of the materials used for the manufacture of the base plate and the layer to be provided thereon. For example, the base plate may also be made of bronze or a chemically etchable synthetic material or the layer to be deposited may be chromium.

What is claimed is:

1. A method of manufacturing a jet nozzle plate for an ink jet printing head, utilizing a base plate in which there is provided a bore in order to form a jet nozzle, said bore having a diameter which is larger than the inner diameter of the ultimate jet nozzle, the base plate being subsequently covered as a whole unit, as far as into the bore, with a layer of a chemically depositable material characterized in that the base plate and said layer consist of different, selectively chemically etchable materials, the method further comprising the steps of:

milling on the front of the base plate a recess which surrounds the bore mainly concentrically at a distance;

depositing the layer with a thickness which defines the inner diameter of the bore to the inner diameter of the ultimate jet nozzle;

grinding down the front of the base plate by an amount which at least equals the thickness of the layer but which is smaller than the sum of the thickness of the layer and the depth of the recess;

etching the base plate from the front to remove the material of the base plate exposed by the grinding operation until the layer projecting from the bore forms a freely projecting cylindrical tube which is surrounded by a trough.

2. A method as claimed in claim 1, characterized in that the recess which surrounds a bore is formed by the milling of a circular ring.

3. A method as claimed in claim 1, characterized in that the recess which surrounds a bore is formed by the milling of straight troughs which together form a polygon.

4. A method as claimed in claim 1, characterized in that the recess which surrounds a bore is milled to a depth which is larger than the thickness of the layer subsequently deposited, after which the front of the base plate is ground down until the layer present in the recess is also slightly ground.

5. A method as claimed in claim 1, characterized in that along the edge of the base plate there is milled a further recess which also covers the edge and which has the same depth as a recess surrounding a bore.

6. A method as claimed in claim 1 for manufacturing a jet nozzle plate which comprises at least two adjacent jet nozzles, characterized in that the recesses which surround the adjacent bores are milled to change over into one another.

7. A method as claimed in claim 1, characterized in that the recess which surrounds a bore is milled further to the same depth as that of the recess surrounding a bore so that it is extended to the edge of the base plate.

8. A jet nozzle plate for an ink jet printing head comprising a base plate of a first material, a plurality of cylindrical bores being provided in said base plate, the wall of each bore being lined with a layer of a second material, said layer extending beyond an end of said bore to form a freely projecting cylindrical tube that is surrounded by an annular trough in the base plate, which is adjoined by a surrounding dam covered by a layer of the second material, said first and second materials being selectively chemically etchable.

* * * * *